United States Patent Office 3,041,809
Patented July 3, 1962

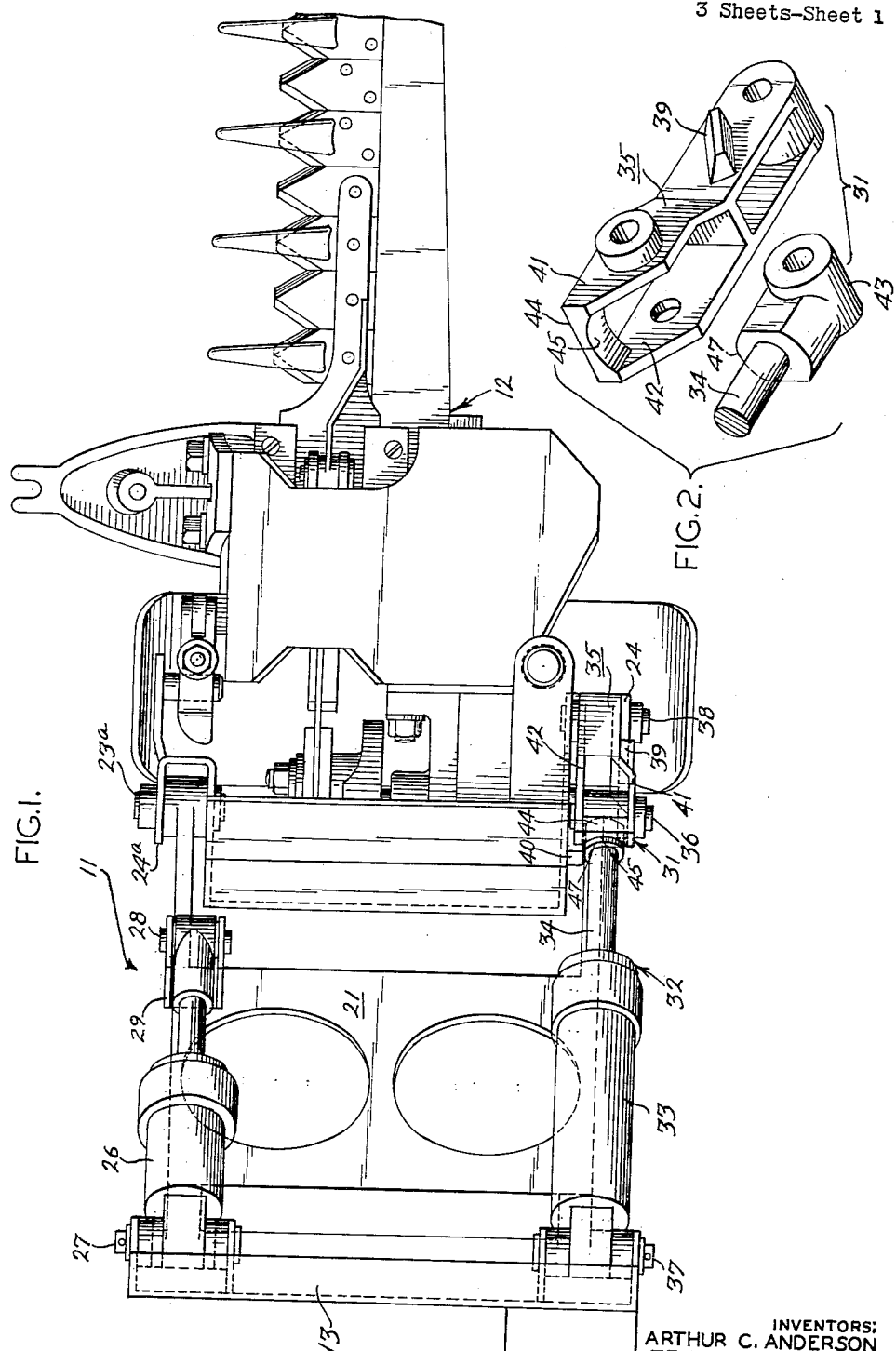

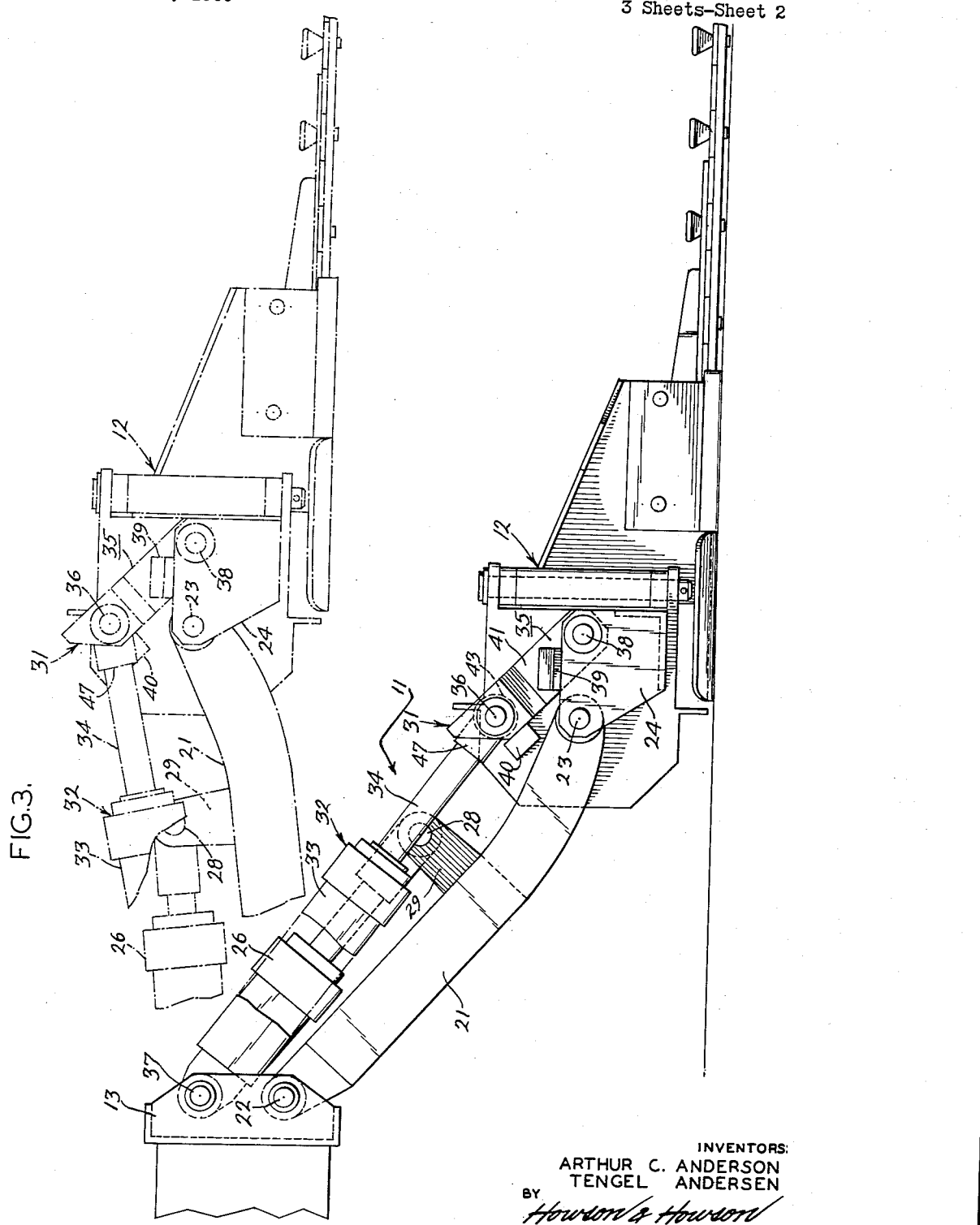

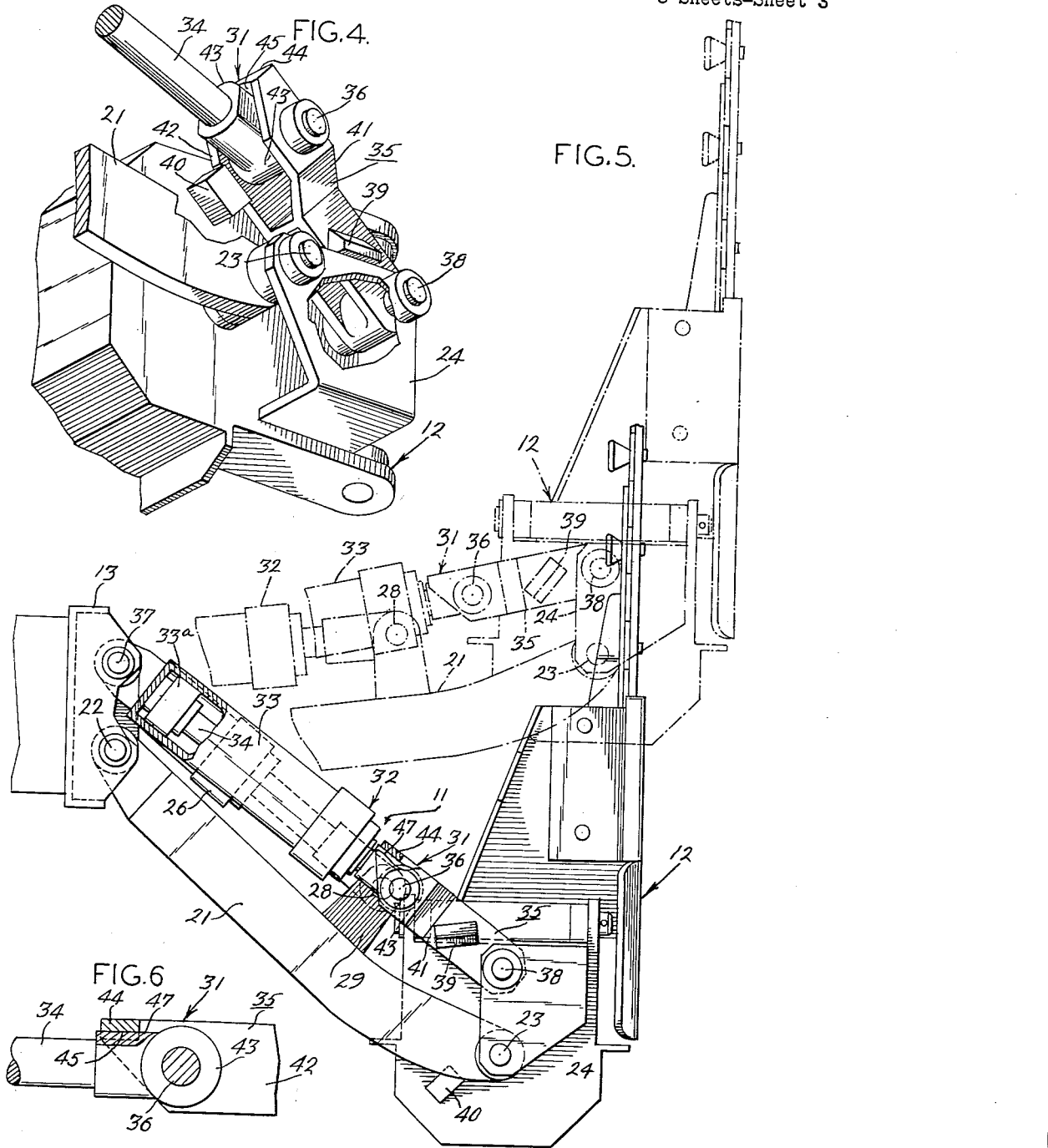

3,041,809
SUSPENSION FOR MOWER UNIT
Arthur C. Anderson, Wildwood Crest, and Tengel Andersen, Wildwood Gardens, N.J., assignors to A. C. Anderson Corporation, Wildwood, N.J., a corporation of New Jersey
Filed Dec. 16, 1960, Ser. No. 76,228
7 Claims. (Cl. 56—25)

The present invention relates to mowing machines of the reciprocatory cutter or sickle bar type, and has particular application to the suspension for mounting the cutter bar assembly on a tractor or other vehicle.

In mowing machines of the stated type, mechanism is provided for pivoting the cutter bar assembly from a substantially horizontal position to an upright position, the latter position being that employed when the assembly is inoperative, as when traveling over the road. In addition, curb lift means is provided to raise or elevate the cutter bar assembly bodily to adjust the height of the assembly relative to the ground wheels of the vehicle. In a conventional mower, when it is necessary to adjust the curb lift mechanism, the angle of the cutter bar must also be adjusted to maintain truly horizontal or vertical positioning of the cutter bar assembly when the latter is horizontal or upright or both.

With the foregoing in mind, the present invention provides a novel suspension for a cutter bar assembly of a mowing machine wherein the cutter bar assembly has parallel movement both when the cutter bar is horizontal and when it is upright during operation of the curb lift mechanism.

More specifically, the present invention provides an articulated linkage having an intermediate pivot which insures parallel movement when the cutter bar assembly is substantially horizontal, and a terminal pivot assuring parallel movement when the cutter bar assembly is upright.

All of the objects of the present invention are more fully set forth hereinafter with reference to the accompanying drawing wherein:

FIG. 1 is a fragmentary plan view of a suspension made in accordance with the present invention;

FIG. 2 is a detached exploded fragmentary perspective view showing elements of the articulated linkage embodied in FIG. 1;

FIG. 3 is a view in rear elevation of the suspension shown in FIG. 1, wherein the cutter bar assembly is substantially horizontal, and showing in broken lines the position of the cutter bar assembly when elevated by the curb lift mechanism;

FIG. 4 is a fragmentary perspective view showing the articulated linkage in the full line position of FIG. 3;

FIG. 5 is a view similar to FIG. 3 wherein the cutter bar assembly is in upright position; and FIG. 6 is an enlarged fragmentary sectional view taken through the intermediate pivot of FIG. 5.

Referring now to the drawing, the illustrated embodiment of the invention comprises a suspension designated generally at 11 which mounts a cutter bar assembly 12 on a support frame 13 of a tractor or other suitable vehicle. The cutter bar assembly 12 may be of conventional construction including cutter bar, blade, drive motor, ground shoes, etc., for example as shown and described in our earlier U.S. Patents Nos. 2,828,598 and 2,931,155.

The suspension 11 comprises a rigid plate-like member 21 pivoted to the support frame 13 at its inner end at 22, for example by pins and pivoted at its outer end coaxially as indicated at 23 and 23a on support brackets 24 and 24a of the cutter bar assembly 12. The axis of the inner pivots 22 is substantially horizontal and are parallel to the common axis of the outer pivots 23 and 23a.

Curb lift mechanism is provided to elevate the rigid member 21 on its inner pivot 22. To this end, a first power-operated extensible member 26, in the present instance a hydraulic cylinder having connections (not shown) to a source of pressurized hydraulic fluid, is pivoted to the support frame 13 by an inner pivot 27 overlying the inner pivotal axis 22 of the rigid member 21 at the forward edge of the latter. The extensible member 26 is pivoted at its outer end at 28 to an upstanding lug 29 on the rigid member 21 so as to extend substantially parallel to the rigid member 21. When the extensible member 26 is retracted, the member 21 is raised on its inner pivot 22 and when the member 26 is extended, the rigid plate-like member 21 is lowered on its inner pivot 22.

In accordance with the invention, an articulated linkage 31 is connected between the support frame 13 and the cutter bar assembly 12 to angularly position the cutter bar assembly on the outer pivots 23 and 23a of the rigid plate-like member 21. In the illustrated embodiment of the invention, the articulated linkage 31 comprises an extensible member 32 consisting of a cylinder 33 and piston 33a and rod 34. A link 35 is connected to the piston rod 34 by means of an intermediate pivot 36. The inner end of the linkage 31 is pivoted to the support frame 13 at a point overlying the rear edge of the member 21, as indicated at 37 and is pivoted to the support bracket 24 at its outer end by an outer pivot 38 whereby retraction of the extensible member 32 raises the cutter bar assembly on the outer pivots 23 and 23a and extension of the member 32 lowers the cutter bar assembly on the outer pivot 23 and 23a of the rigid plate-like member.

Stop means is provided to limit relative movement of the piston rod 34 and the link 35 between a substantially aligned position as shown in full lines in FIGS. 3 and 5 and a cocked position shown in broken lines in FIG. 3. To this end, the link 35 is provided with a stop 39 projecting rearwardly therefrom to engage the upper edge of the bracket 24 as best shown in FIG. 4. A similar stop 40 projects rearwardly from the cutter bar assembly to engage under the link 35. The stops 39 and 40 cooperate to limit counterclockwise movement of the link 35 on the outer pivot.

In addition, stop means is provided to limit counterclockwise pivotal movement of the link 35 on the intermediate pivot 36 at the outer end of the extensible member 32. To this end, the link 35 is formed as a yoke having arms 41 and 42 between which the head 43 of the piston rod 34 is received. A bridge 44 extends between the outer extremities of the arms 41 and 42 and has an arcuate seat 45 which engages a collar 47 on the head 43 when the link 35 and rod 34 are slightly beyond the truly aligned position as shown in full lines in FIG. 5 and FIG. 6. In other words, the intermediate pivot 36 passes slightly beyond or below an imaginary straight line connecting the inner and outer pivots 37 and 38. Thus, when the elements of the articulated linkage 31 are substantially aligned, the stop means permits slight over-center movement and an axial force does not tend to buckle or cock the articulated linkage on the intermediate pivot 36. It should be noted that when the cutter bar assembly is upright as shown in FIG. 5, the extensible member 32 is in its fully retracted position, and in this position, the center of gravity of the cutter bar assembly 12 is outboard of the pivot points 38 and 23 to thereby tend to swing the assembly 12 clockwise on the pivots 23 and 23a and thereby assist in preventing the articulated linkage 31 from cocking.

By reason of the foregoing construction, when the cutter bar control linkage 31 is extended as shown in FIGS. 1 and 3 to position the cutter bar assembly substantially horizontal, locking of the extensible member 32 in the extended position shown, causes the suspension to pivot on the inner pivots 22 and 37 and the outer and intermediate pivots 23, 23a and 36 when the curb lift element 26 is actuated to raise and lower the cutter bar assembly. As best shown in FIG. 3, the pivot points 22, 23, 36, and 37 define a parallelogram which insures parallel movement of the cutter bar assembly during elevation and lowering by the curb lift mechanism. On the other hand, when the cutter bar assembly 12 is pivoted to its upright position, for example by retraction of the extensible member 32, the suspension pivots on the inner pivots 22 and 37 and the outer pivots 23 and 38, as shown in FIG. 5. With the elements in this position, the pivot points 22, 23, 38, and 37 also form a parallelogram insuring parallel movement of the cutter bar in its upright position.

While a particular embodiment of the present invention has been herein illustrated and described, it is not intended to limit the invention to such disclosure, but changes and modifications may be made therein and thereto within the scope of the following claims.

We claim:

1. A suspension for mounting a cutter bar assembly on a vehicle comprising a rigid member pivoted at its inner end to the vehicle and at the outer end to said cutter bar assembly, means to lower and raise said rigid member on its inner pivot, and an articulated linkage comprising an extensible member and a connecting link pivoted to said extensible member by an intermediate pivot, said linkage extending substantially parallel to said rigid member, having an inner pivot at its inner end on said vehicle, and having an outer pivot at its outer end on said cutter bar assembly, said extensible member being operable between a retracted position disposing said cutter bar assembly in upright position on the outer pivot of said rigid member, and an extended position disposing said cutter bar assembly in horizontal position on the outer pivot of said rigid member, the inner and outer pivots of said rigid member and the inner and outer pivots of said articulated linkage defining a parallelogram in the retracted position of said articulated linkage, and the inner and outer pivots of said rigid member and the inner and intermediate pivots of said articulated linkage defining a parallelogram in the aforesaid extended position of said articulated linkage.

2. A suspension according to claim 1 including stop means to position said link in substantial alignment with said extensible member in the retracted position of said articulated linkage.

3. A suspension according to claim 2 wherein said connecting link comprises a yoke element having arms straddling said extensible member at said intermediate pivot, and a bridge extending between said arms providing a seat engaging the extensible member in its retracted position to constitute said stop means to position said link in substantial alignment with said extensible member, the intermediate pivot being beyond the imaginary straight line connecting the inner and outer pivots of the articulated linkage.

4. A suspension according to claim 1 including stop means to immobilize said connecting link relative to said cutter bar assembly in the aforesaid extended position of said linkage to insure pivotal movement on said intermediate pivots.

5. A suspension according to claim 4 wherein said stop means comprises a stop element on said connecting link engaging said cutter bar assembly when it is in its horizontal position to limit pivotal movement on said outer pivot.

6. A suspension according to claim 1 wherein the center of gravity of said cutter bar assembly is outboard of said outer pivots in both the upright and horizontal positions thereof.

7. A suspension for mounting a cutter bar assembly on a vehicle comprising a rigid member pivoted at its inner end to the vehicle and at the outer end to said cutter bar assembly, a first power-operated extensible member parallel to said rigid member and having a pivot at its inner end on said vehicle at a point spaced from said rigid member, and a pivot at its outer end on said rigid member whereby extension and retraction of said extensible member lowers and raises said rigid member on its inner pivot, an articulated linkage comprising a second power-operated extensible member and a connecting link pivoted to said extensible member by an intermediate pivot, said linkage extending substantially parallel to said rigid member, having an inner pivot at its inner end on said vehicle, and having an outer pivot at its outer end on said cutter bar assembly, said second extensible member being operable between a retracted position disposing said cutter bar assembly in upright position on the outer pivot of said rigid member, and an extended position disposing said cutter bar assembly in horizontal position on the outer pivot of said rigid member, the inner and outer pivots of said rigid member and the inner and outer pivots of said articulated linkage defining a parallelogram in the retracted position of said articulated linkage, and the inner and outer pivots of said rigid member and the inner and intermediate pivots of said articulated linkage defining a parallelogram in the aforesaid extended position of said articulated linkage.

References Cited in the file of this patent
UNITED STATES PATENTS

| | | |
|---|---|---|
| 2,828,598 | Anderson et al. | Apr. 1, 1958 |
| 2,931,155 | Anderson et al. | Apr. 5, 1960 |